United States Patent
Ahn et al.

(10) Patent No.: US 9,984,563 B2
(45) Date of Patent: May 29, 2018

(54) METHOD AND DEVICE FOR CONTROLLING SUBORDINATE ELECTRONIC DEVICE OR SUPPORTING CONTROL OF SUBORDINATE ELECTRONIC DEVICE BY LEARNING IR SIGNAL

(71) Applicant: SMART ALWAYS ON, Seoul (KR)

(72) Inventors: Tae Hyo Ahn, Seoul (KR); Hyun Kwon Ahn, Seoul (KR)

(73) Assignee: SMART ALWAYS ON, Seoul (KR)

( * ) Notice: Subject to any disclaimer, the term of this patent is extended or adjusted under 35 U.S.C. 154(b) by 0 days. days.

(21) Appl. No.: 15/859,953

(22) Filed: Jan. 2, 2018

(65) Prior Publication Data

US 2018/0122226 A1 May 3, 2018

Related U.S. Application Data

(63) Continuation of application No. PCT/KR2016/007143, filed on Jul. 1, 2016.

(30) Foreign Application Priority Data

Jul. 2, 2015 (KR) .......................... 10-2015-0094910

(51) Int. Cl.
| | | |
|---|---|---|
| *H04L 12/28* | (2006.01) | |
| *G08C 23/04* | (2006.01) | |
| *G06F 17/30* | (2006.01) | |

(52) U.S. Cl.
CPC ....... *G08C 23/04* (2013.01); *G06F 17/30371* (2013.01); *H04L 12/282* (2013.01);
(Continued)

(58) Field of Classification Search
CPC ................ G08C 23/04; G08C 2201/20; G08C 2201/70; G08C 2201/92; G06F 17/30371; H04L 12/281
(Continued)

(56) References Cited

U.S. PATENT DOCUMENTS

| | | | |
|---|---|---|---|
| 2006/0210278 A1* | 9/2006 | Cregg ................... | G08C 23/04 398/107 |
| 2010/0215375 A1* | 8/2010 | Reams .................. | G08C 17/02 398/107 |

(Continued)

FOREIGN PATENT DOCUMENTS

| | | | | |
|---|---|---|---|---|
| EP | 1868324 A2 * | 12/2007 | ......... | H04L 12/2803 |
| KR | 1020020078727 A | 10/2002 | | |

(Continued)

*Primary Examiner* — Dalzid Singh
(74) *Attorney, Agent, or Firm* — Husch Blackwell LLP (57) ABSTRACT

A method for controlling a subordinate electronic device by learning an IR signal is provided. An electronic control device acquires control signal induction information corresponding to an identifier of the specific IR signal upon acquiring a specific IR signal. Alternatively, the electronic control device may support an electronic control device of another space such that the electronic control device acquires the control signal induction information corresponding to the identifier of the specific IR signal. The electronic control device generates a specific IR signal by using the acquired control signal induction information, if a user of a predetermined space or another space intends to control a specific subordinate electronic device. The database acquires a plurality of IR signals in a first space to an n-th space, sorts IR signals not overlapping among the plurality of IR signals, and manages the control signal induction information corresponding to each IR signal not overlapping.

30 Claims, 7 Drawing Sheets

(52) U.S. Cl.
CPC ..... *G08C 2201/20* (2013.01); *G08C 2201/70* (2013.01); *G08C 2201/92* (2013.01)

(58) Field of Classification Search
USPC .......................................................... 398/106
See application file for complete search history.

(56) References Cited

U.S. PATENT DOCUMENTS

2012/0249890 A1* 10/2012 Chardon .................. H04N 5/44
348/734
2017/0270781 A1* 9/2017 McKay .................. G08C 23/04

FOREIGN PATENT DOCUMENTS

| KR | 1020070028833 A | 3/2007 |
| KR | 1020110038424 A | 4/2011 |
| KR | 1020140023169 A | 2/2014 |

* cited by examiner

METHOD AND DEVICE FOR CONTROLLING SUBORDINATE ELECTRONIC DEVICE OR SUPPORTING CONTROL OF SUBORDINATE ELECTRONIC DEVICE BY LEARNING IR SIGNAL

CROSS REFERENCE TO RELATED APPLICATIONS

This application is a continuation of prior International Application PCT Application No. PCT/KR2016/007143 filed on Jul. 1, 2016, which claims the benefit of priority from Korean Patent Application No. 10-2015-0094910 filed on Jul. 2, 2015. The disclosures of International Application PCT Application No. PCT/KR2016/007143 and Korean Patent Application No. 10-2015-0094910 are incorporated herein by reference.

FIELD OF THE INVENTION

The present invention relates to a method of a control device controlling or supporting another control device to control a slave electronic device by learning multiple IR signals, and more particularly, to the method including steps of: (a) the control device in a predetermined space, if at least one particular IR signal is obtained for controlling a specific slave electronic device within the predetermined space, acquiring reference triggering information corresponding to an identifier of the particular IR signal by referring to a database or said another control device in another space other than the predetermined space acquiring the reference triggering information corresponding to the identifier of the particular IR signal; and (b) the control device in the predetermined space, in case that a user of the predetermined space or a user of said another space intends to control the specific slave electronic device or one or more similar devices, generating or supporting said another control device in said another space to generate the particular IR signal by using the acquired reference triggering information, wherein the multiple IR signals are acquired within a 1-st space to an n-th space, where the 1-st space to the n-th space include at least part of the predetermined space and said another space, wherein one or more device-specific IR signals are identified and selected among the multiple IR signals, and wherein the database manages each piece of the reference triggering information which corresponds to the respective device-specific IR signals; and the control device using the same.

BACKGROUND OF THE INVENTION

Recently, smart phone as the head of the trend, various smart devices have emerged in the market one after another such as smart TV, smart refrigerator, and smart air conditioner and so on. The smart devices may support interactions between users and devices through user experiences and may support functional changes or functional expansions through application programs. However, in spite of the emergence of such smart devices, remote controllers are still commonly used to operate these smart devices.

Figure 1:
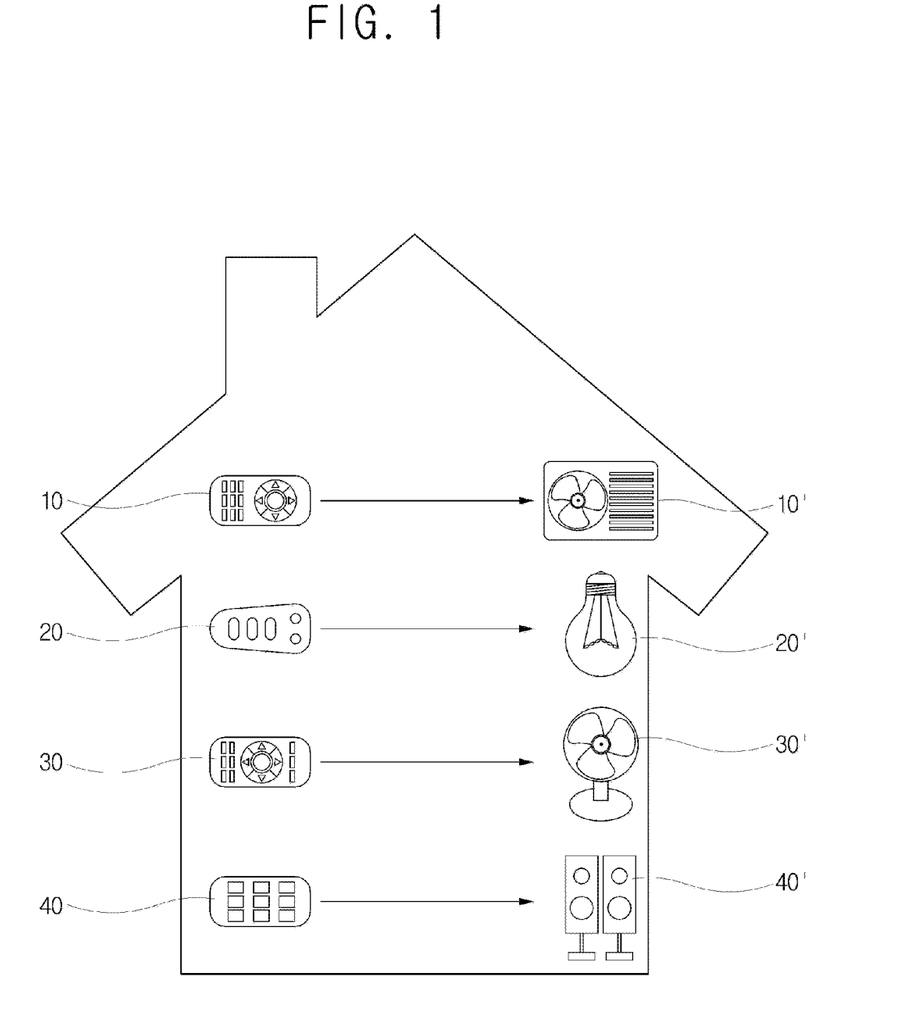
FIG. 1 is a conceptual drawing showing a situation in which various types of slave electronic devices within a house are controlled by using respective remote controllers.

FIG. 1 is a conceptual drawing showing a situation in which various types of electronic devices within a house are controlled by using respective remote controllers.

As shown in FIG. 1, as the number of types of the electronic devices disposed in the house increases, the number of corresponding remote controllers for controlling each of the electronic devices also increases, conventionally.

Accordingly, the users may need to respectively manage the respective remote controllers 10, 20, 30, 40 of the individual electronic devices 10', 20' 30' 40'. And it is cumbersome to find and operate each of the remote controllers 10, 20, 30, 40 for controlling each of the electronic devices 10', 20' 30' 40'.

Besides, the respective remote controllers have many buttons supporting various functions of their corresponding electronic devices. Thus, the users may need to learn the respective functions of the individual buttons of the respective remote controllers 10, 20, 30, 40, and it is cumbersome for the users to find a correct button to perform a particular function whenever using the respective remote controllers.

Although an integrated remote controller may be considered as a solution to solve such a problem, the integrated remote controller cannot control a new electronic device which is newly purchased. And separate repair is required for the registration of the new electronic device.

Accordingly, the inventor of the present invention proposes a method and a device for learning remote controller signals in a predetermined space (i) not only to control any new electronic device by using remote controllers' signals (ii) but also to generate the remote controllers' signals to control the electronic device within the predetermined space by using voice control without operating the respective remote controllers.

SUMMARY OF THE INVENTION

The present invention aims to solve all the problems described above.

It is an object of the present invention not only to control any electronic device including new one based on remote controllers' signals by learning the remote controllers' signals in a predetermined space, but also to control electronic devices in the predetermined space by generating remote controllers' signals simply via voice control without operating individual remote controllers.

Besides, it is another object of the present invention to quickly update mapping information of various types of triggering information by recording current triggering information in a database and sharing the recorded data in the database among several control devices in different spaces, in case that the current triggering information corresponding to a particular IR signal acquired in the predetermined space is not found in the database.

Also, it is still another object of the present invention to readily control various types of the electronic devices without the remote controllers by converting current triggering information generated by users into particular IR signals with a reference to the database and by sending out the particular IR signals to control the electronic devices in a house.

In addition, it is still yet another object of the present invention to generate a specific IR signal corresponding to specific reference triggering information having the highest degree of similarity with the current triggering information generated by a user, and record mapping relationships among the current triggering information, the specific identifier of the specific IR signal corresponding to the specific reference triggering information, and the specific IR signal, thereby updating the database, in case there is no identifier of the particular IR signal corresponding to the current triggering information in the database.

Further, it is still yet another object of the present invention to generate the particular IR signal by referring to pattern information acquired base on records of controlling a specific slave electronic devices in the predetermined space, and to generate the particular IR signal by analyzing voice data included in the current triggering information and thereby further taking into account recognized speaker information.

Finally, it is still yet another object of the present invention to acquire or generate the particular IR signal while minimizing the influence of the directivity of the particular IR signal by changing a sensing angle of an IR sensor to acquire the particular IR signal in a specific direction and generating the particular IR signal in a direction toward a location of the specific slave electronic device.

In accordance with one aspect of the present invention, there is provided a method of a control device controlling or supporting another control device to control a slave electronic device by learning multiple IR signals, including steps of: (a) the control device in a predetermined space, if at least one particular IR signal is obtained for controlling a specific slave electronic device within the predetermined space, acquiring reference triggering information corresponding to an identifier of the particular IR signal by referring to a database or said another control device in another space other than the predetermined space acquiring the reference triggering information corresponding to the identifier of the particular IR signal; and (b) the control device in the predetermined space, in case that a user of the predetermined space or a user of said another space intends to control the specific slave electronic device or one or more similar devices, generating or supporting said another control device in said another space to generate the particular IR signal by using the acquired reference triggering information, wherein the multiple IR signals are acquired within a 1-st space to an n-th space, where the 1-st space to the n-th space include at least part of the predetermined space and said another space, wherein one or more device-specific IR signals are identified and selected among the multiple IR signals, and wherein the database manages each piece of the reference triggering information which corresponds to the respective device-specific IR signals.

In accordance with another aspect of the present invention, there is provided a method of a control device controlling or supporting another control device to control a slave electronic device by learning multiple IR signals, including steps of: (a) the control device in a predetermined space, if at least one particular IR signal is obtained for controlling a specific slave electronic device within the predetermined space, acquiring particular reference triggering information corresponding to an identifier of the particular IR signal by referring to a database or supporting said another control device in another space other than the predetermined space to acquire the particular reference triggering information corresponding to the identifier of the particular IR signal; and (b) the control device in the predetermined space, in case that a user of the predetermined space or a user of said another space intends to control the specific slave electronic device or one or more similar devices, generating or supporting said another control device in said another space to generate the particular IR signal by using the particular reference triggering information, wherein the multiple IR signals are acquired within a 1-st space to an n-th space, where the 1-st space to the n-th space include at least part of the predetermined space and said another space, wherein one or more device-specific IR signals are identified and selected among the multiple IR signals, and wherein the database manages each piece of the reference triggering information which corresponds to the respective device-specific IR signals.

In accordance with still another aspect of the present invention, there is provided a control device in a predetermined space for controlling or supporting another control device to control a slave electronic device by learning multiple IR signals, including: a triggering information acquiring unit, if at least one particular IR signal is obtained for controlling a specific slave electronic device within the predetermined space, for acquiring particular reference triggering information corresponding to an identifier of the particular IR signal by referring to a database or for supporting said another control device in another space other than the predetermined space to acquire the particular reference triggering information corresponding to the identifier of the particular IR signal; and an IR signal generating unit, in case that a user of the predetermined space or a user of said another space intends to control the specific slave electronic device or one or more similar devices, for generating or supporting said another control device in said another space to generate the particular IR signal by using the particular reference triggering information, wherein the multiple IR signals are acquired within a 1-st space to an n-th space, where the 1-st space to the n-th space include at least part of the predetermined space and said another space, wherein one or more device-specific IR signals are identified and selected among the multiple IR signals, and wherein the database manages each piece of the reference triggering information which corresponds to the respective device-specific IR signals.

In accordance with still yet another aspect of the present invention, there is provided a control device in a predetermined space for controlling or supporting another control device to control a slave electronic device by learning multiple IR signals, including: a triggering information acquiring unit for obtaining current triggering information capable of controlling a specific slave electronic device; and an IR signal generating unit for obtaining or support said another control device to obtain an identifier of a particular IR signal corresponding to the current triggering information by referring to a database and generating or support said another control device to generate the particular IR signal corresponding to the current triggering information, wherein the multiple IR signals are acquired within a 1-st space to an n-th space, where the 1-st space to the n-th space includes at least the predetermined space, wherein one or more device-specific IR signals are identified and selected among the multiple IR signals, and wherein the database manages each piece of reference triggering information which corresponds to the respective device-specific IR signals.

BRIEF DESCRIPTION OF THE DRAWINGS

The above and other objects and features of the present invention will become conspicuous from the following description of preferred embodiments given in conjunction with the accompanying drawings, in which.

DETAILED DESCRIPTION OF THE PREFERRED EMBODIMENTS

To make purposes, technical solutions, and merits of the present invention clear and definite, references are made to the accompanying drawings that show, by way of illustration, more detailed example embodiments in which the invention may be practiced. These embodiments are described in sufficient details to enable those skilled in the art to practice the disclosed invention.

It is to be appreciated that the various embodiments of the present invention, although different, are not necessarily mutually exclusive. For example, a particular feature, structure, or characteristic described and disclosed herein in connection with one embodiment may be implemented jointly with or in other embodiments without departing from the spirit and the scope of the present invention. In addition, it is to be understood that the position or arrangement of individual elements within each disclosed embodiment may be modified without departing from the spirit and the scope of the present invention. The following detailed description is, therefore, not to be taken in a limiting sense, and the scope of the present invention is defined only by the claims appended, appropriately interpreted, along with the full range of equivalents to which the claims are entitled. In the drawings, like reference numerals refer to like or similar features throughout the several views.

Hereinafter, preferred embodiments of the present invention will be described in detail with a reference to the accompanying drawings so as to make those skilled in the art readily implement example embodiments of the present invention.

Figure 2:
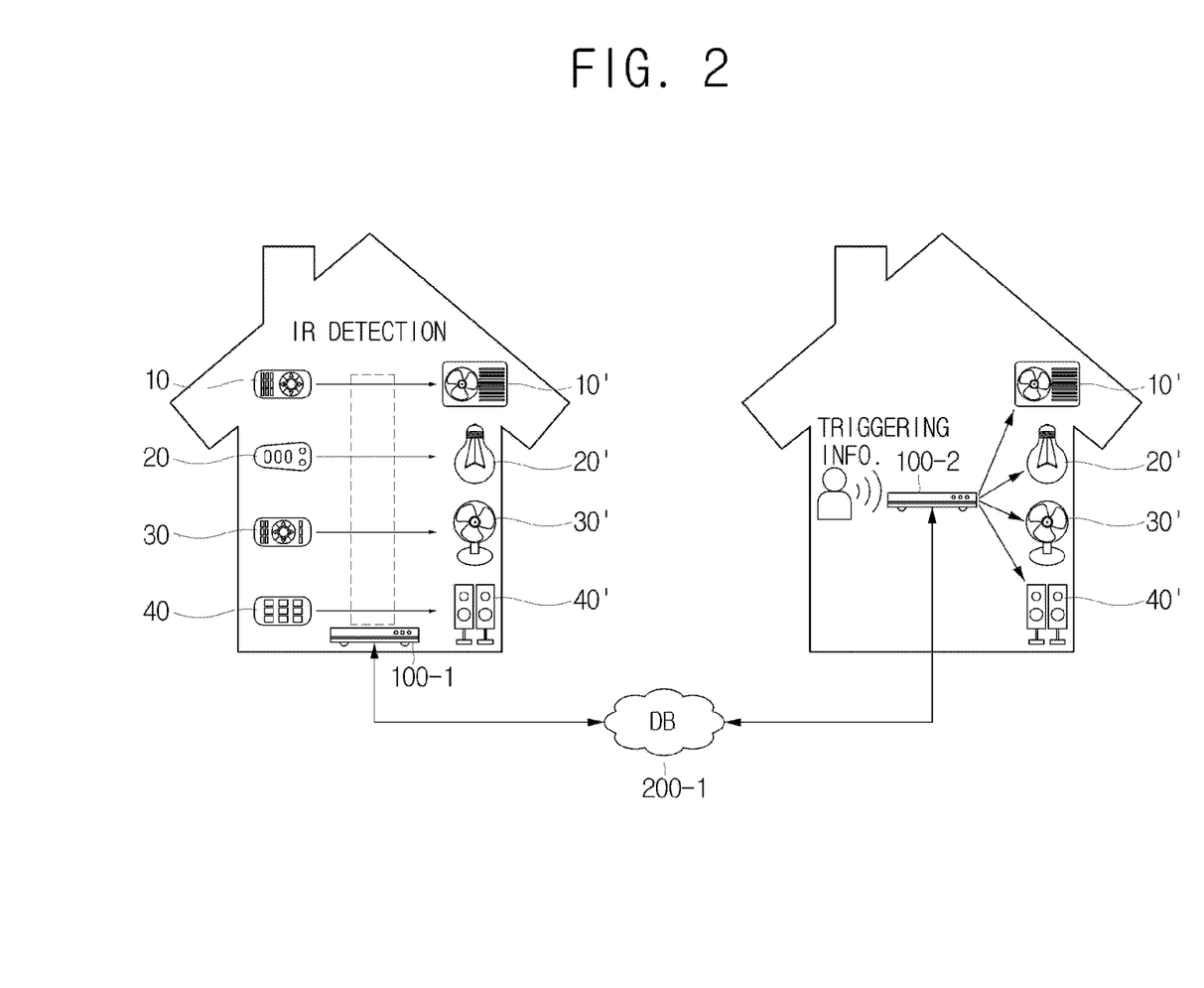
FIG. 2 is a conceptual drawing illustrating operations of a control device for controlling slave electronic devices or for supporting another control device to control the slave electronic devices in accordance with one example embodiment of the present invention.

FIG. 2 is a conceptual drawing illustrating operations of a control device for controlling slave electronic devices or for supporting another control device to control the slave electronic devices in accordance with one example embodiment of the present invention.

The control device may be a setup box, an IoT device, or one of various electronic devices, located in a predetermined space, capable of communicating with other devices connected by networks. The control device may be a variety of devices for controlling or supporting another device to control the slave electronic devices.

Referring to FIG. 2, the control device 100-1 may obtain (or detect) a particular IR signal for controlling a specific slave electronic device in the predetermined space. The control device 100-1 may obtain particular reference triggering information corresponding to at least one identifier of the particular IR signal by referring to a database 200-1. Herein, the identifier of the particular IR signal represents information for identifying the particular IR signal capable of controlling the specific slave electronic device. For example, the identification information may be parameter data representing such as a type, a manufacturer, command information of a slave electronic device. While the reference triggering information represents triggering information recorded in the database, current triggering information represents triggering information inputted by a user or any other means. The current triggering information may be information for inducing the particular IR signal, that is, a control signal capable of controlling the specific slave electronic device. The current triggering information may include voice data, text data which have been converted from the voice data, or user command data which have been converted from the text data into a predetermined data format. For instance, in case that a user intends to turn on the specific slave electronic device, e.g., TV, via voice command, the text data "Turn on TV" converted from the voice data may be the current triggering information. However, it is conspicuous to those skilled in the art that the current triggering information is not limited to the voice data or any data format related to the voice data. For example, the current triggering information may include gesture data, the text data which have been converted from the gesture data, or the user command data which have been converted from the text data into the predetermined data format. The control devices 100-1, 100-2 may interpret the current triggering information by referring to the particular reference triggering information.

In addition, the control device 100-1 may support said another control device 100-2 located in another space other than the predetermined space to obtain the particular reference triggering information corresponding to the identifier of the particular IR signal. Specifically, in case that there is no particular reference triggering information corresponding to the identifier of the particular IR signal in the database 200-1, the control device 100-1 may obtain current triggering information corresponding to the identifier of the particular IR signal as a result of analyzing information on user interactions or operating information on IoT (Internet of Thing) devices in the predetermined space, thereby updating the database 200-1. Herein, in the database 200-1, the mapping information between the current triggering information and the identifier of the particular IR signal is newly recorded. Then, the control device 100-1 may support said another control device 100-2 to obtain mapping information between the current triggering information and the identifier of the particular IR signal by referring to the updated database 200-1. More details will be delineated later.

Meanwhile, in case that there is the particular reference triggering information corresponding to the identifier of the particular IR signal in the database 200-1, on condition that the user in the predetermined space or said another space intends to control the specific slave electronic device or similar kinds thereof, if the user in the predetermined space is allowed to input the current triggering information, the control device 100-1 in the predetermined space may compare the current triggering information with all reference triggering information obtained from the database 200-1 to recognize the current triggering information as the particular reference triggering information, and the control device 100-1 may generate or support said another control device, e.g., a remote controller, to generate the particular IR signal corresponding to the particular reference triggering information. Likewise, on condition that the user in said another space intends to control the specific slave electronic device or the similar kinds thereof, if the user in said another space is allowed to input the current triggering information, the control device 100-2 in said another space may recognize the current triggering information inputted by the user in said another space by comparing it with all the reference triggering information obtained from the database 200-1, and the control device 100-2 may generate or support said another control device, e.g., a remote controller, to generate the particular IR signal corresponding to the particular reference triggering information. Specifically, the control devices 100-1, 100-2 in the predetermined space or in said another space may generate or may support said another control device to generate the particular IR signal as an action in response to the current triggering information in case the user in the predetermined space or in said another space generates the current triggering information in order to control the specific slave electronic device or the similar kinds thereof. Herein, the current triggering information may be the voice data which are collected from the user as described above. For example, if the user in said another space intends to control an air conditioner which is a same kind as the specific slave electronic device in the predetermined space by uttering "Turn on XX air conditioner", the control device 100-2 in said another space may recognize the current triggering information, i.e., "Turn on XX air conditioner" by referring to the database 200-1, and then generate and send out the particular IR signal capable of instructing the power of air conditioner 10' corresponding to the XX air conditioner to be turned on.

Herein, the control devices 100-1, 100-2 in the predetermined space or in said another space may generate the particular IR signal preferentially by referring to a local database or a local storage rather than the database 200-1. In such a case, various kinds of reference triggering information corresponding to the particular IR signal other than the particular reference triggering information may further be stored in the local database or the local storage. As described in the example above, the control devices 100-1, 100-2 may generate and send out the same IR signal for various voice data such as "Turn on the power of the air conditioner", "Turn on the air conditioner" and "Air conditioner on".

Meanwhile, the database 200-1 may manage and store the mapping information between respective IR signals and its corresponding reference triggering information. Specifically, the database 200-1 may store the mapping information between identifiers of the respective IR signals and their corresponding reference triggering information. Also, the database 200-1 may be referred and shared by several control devices which are of the same type and are located in several spaces. Particularly, the database 200-1 may obtain multiple IR signals within a 1-st space to an n-th space, may select device-specific IR signals, i.e., "slave electronic device"-specific IR signals, among the multiple IR signals, and may manage the mapping information between the respective device-specific IR signals and their corresponding reference triggering information. Herein, the 1-st space to the n-th space may include at least the predetermined space or said another space.

Hereinafter, a configuration and operations of the control device for controlling or supporting said another control device to control the slave electronic devices by learning the multiple IR signals will be delineated in more detail. In the above description, the control device 100-1 in the predetermined space and the control device 100-2 in said another space have been distinguished from each other and explained separately. However, since the two control devices are of the same type, both may have the same configuration and operations, and thus the two control devices will be described as one control device 100 hereinafter. That is, the description of the control device 100 delineated below may be applied both to the control device 100-1 in the predetermined space and the control device 100-2 in said another space described above.

Figure 3:
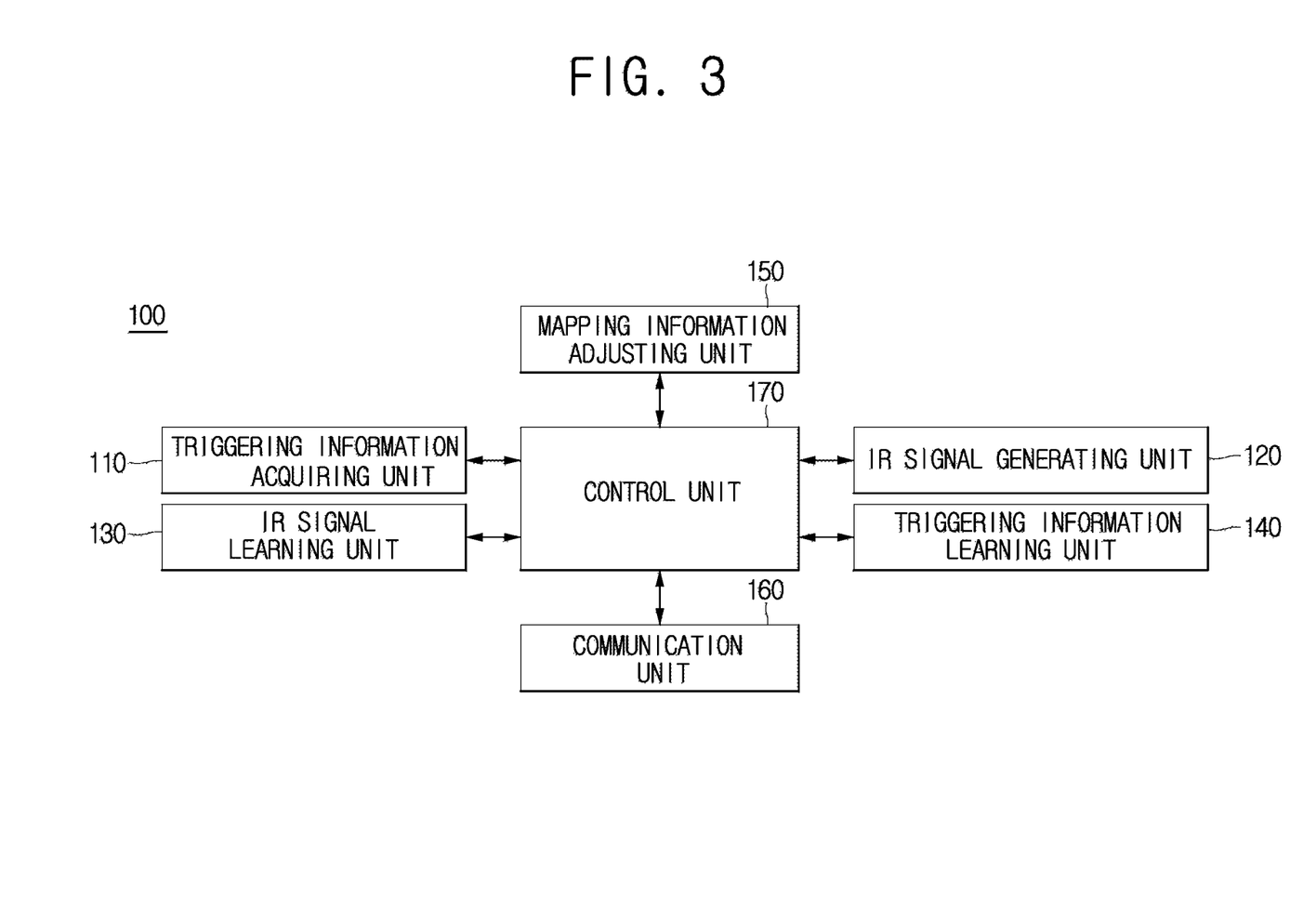
FIG. 3 is a block diagram showing a configuration of the control device for controlling the slave electronic devices or for supporting said another control device to control the slave electronic devices by learning multiple IR signals in accordance with one example embodiment of the present invention.

FIG. 3 is a block diagram showing the configuration of the control device for controlling the slave electronic devices or for supporting said another control device to control the slave electronic devices by learning the multiple IR signals in accordance with one example embodiment of the present invention.

Referring to FIG. 3, the control device 100 for controlling or supporting said another control device to control the slave electronic devices by learning the multiple IR signals may include a triggering information acquiring unit 110, an IR signal generating unit 120, an IR signal learning unit 130, a triggering information learning unit 140, a mapping information adjusting unit 150, a communication unit 160 and a control unit 170 such as a processor.

In detail, if the particular IR signal for controlling the specific slave electronic device in the predetermined space is obtained, the triggering information acquiring unit 110, by referring to the database 200-1, may obtain the particular reference triggering information corresponding to the identifier of the particular IR signal or may support said another control device in said another space other than the predetermined space to obtain the particular reference triggering information corresponding to the identifier of the particular IR signal. First, the triggering information acquiring unit 110 may obtain the particular IR signal for controlling the specific slave electronic device in the predetermined space through an IR receiver module (not shown) or a separate IR receiver device (not shown). And the triggering information acquiring unit 110 may identify the particular IR signal by referring to the database 200-1. Accordingly, the triggering information acquiring unit 110 may obtain the particular reference triggering information corresponding to the identifier of the particular IR signal. Then, for example, the triggering information acquiring unit 110 may obtain the user command data capable of instructing the power of the air conditioner to be turned on and the user command data may be applied by using the particular IR signal.

However, it may be the case that there is no particular reference triggering information corresponding to the identifier of the particular IR signal in the database 200-1. Hereinafter, the operations of the control device 100 for such a case will be described.

Figure 4:
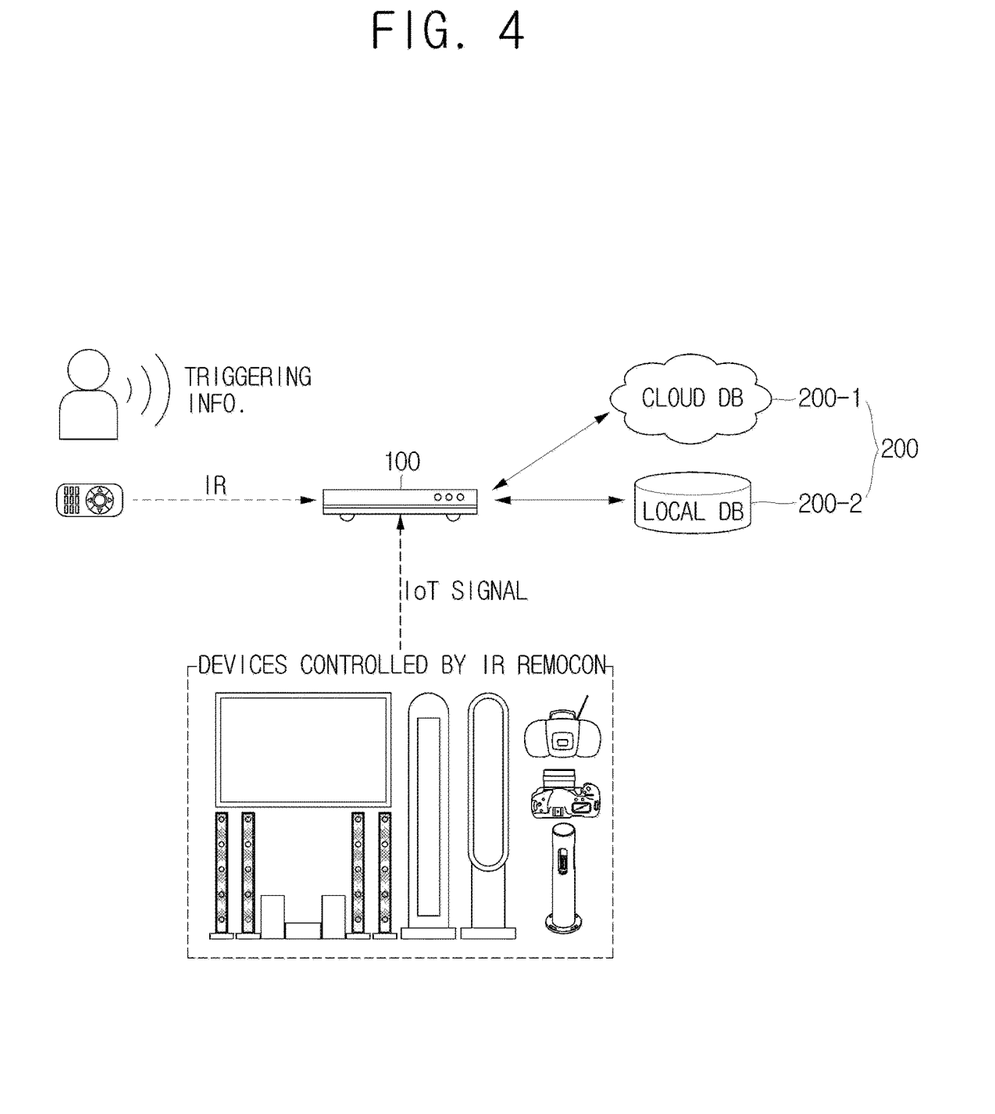
FIG. 4 is a drawing illustrating the operations of the control device in case that current triggering information is not retrieved from databases.

FIG. 4 is a drawing illustrating the operations of the control device 100 in case that the particular reference triggering information is not retrieved from the database 200-1.

Referring to FIG. 4, if the particular IR signal is generated by an action of the user in the predetermined space to control the specific slave electronic device, the control device 100 in the predetermined space may search for the particular reference triggering information corresponding to the identifier of the particular IR signal by referring to a local database 200-2 in the predetermined space. The local database 200-2 may be installed in a storage unit (not shown) of the control device 100 or it may be installed in a separate device connected via home network.

Moreover, if there is no particular reference triggering information corresponding to the identifier of the particular IR signal in the local database 200-2 in the predetermined space, the triggering information acquiring unit 110 may search for the particular reference triggering information corresponding to the identifier of the particular IR signal with a reference to the database 200-1. Herein, the database 200-1 may be a cloud database. That is, the database 200-1 may be a database which is capable of being referred by the individual control devices disposed in different spaces. Therefore, "the database 200-1" in the present invention may be referred as a public database.

Further, if there is no particular reference triggering information corresponding to the identifier of the particular IR signal in the database 200-1, the triggering information acquiring unit 110 may obtain the current triggering information corresponding to the identifier of the particular IR signal as a result of analyzing the information on the user interactions or the operating information on the IoT devices in the predetermined space. Specifically, in case that the particular reference triggering information corresponding to the identifier of the particular IR signal is not stored in the database 200-1, the triggering information acquiring unit 110 may acquire the current triggering information corresponding to the identifier of the particular IR signal as a result of analyzing the current triggering information, e.g., the voice data, generated by the user in the predetermined space or operating status information of the IoT devices, i.e., IoT signals, received from the IoT devices. For example, in case that the control device 100-1 in the predetermined space obtains the particular IR signal capable of instructing the power of the air conditioner to be turned on, if there is no particular reference triggering information with respect to the particular IR signal in the database 200-1, the triggering information acquiring unit 110 may obtain the voice data such as "Turning on the air conditioner" or information representing that the power of the air conditioner is turned on as the current triggering information corresponding to the particular IR signal.

Contrarily, if there is the particular reference triggering information corresponding to the identifier of the particular IR signal in the database 200-1, the triggering information acquiring unit 110 may acquire the particular reference triggering information corresponding to the identifier of the particular IR signal by referring to the database 200-1. In such a case, the control device 100-1 in the predetermined space may update or may support said another control device to update the local database by downloading data of the database 200-1.

Furthermore, in case that there is no particular reference triggering information corresponding to the identifier of the particular IR signal in the database 200-1, the IR signal learning unit 130 may store, in at least part of the database 200-1 and the local database 200-2, the mapping information obtained by mapping the identifier of the particular IR signal to the current triggering information corresponding to the identifier of the particular IR signal. Herein, the mapping information may be obtained as a result of analyzing the information on the user interactions or the operating information on the IoT devices in the predetermined space. As the example described above, in case there is no information regarding the particular IR signal capable of turning on the air conditioner in the database 200-1, the triggering information acquiring unit 110 may obtain the voice data of "Turning on the air conditioner" through the user input as the current triggering information and the IR signal learning unit 130 may learn the particular IR signal by storing the mapping information of the detected particular IR signal and the current triggering information, i.e., the voice data of "Turning on the air conditioner", in at least part of the database 200-1 and the local database 200-2.

Figure 5:
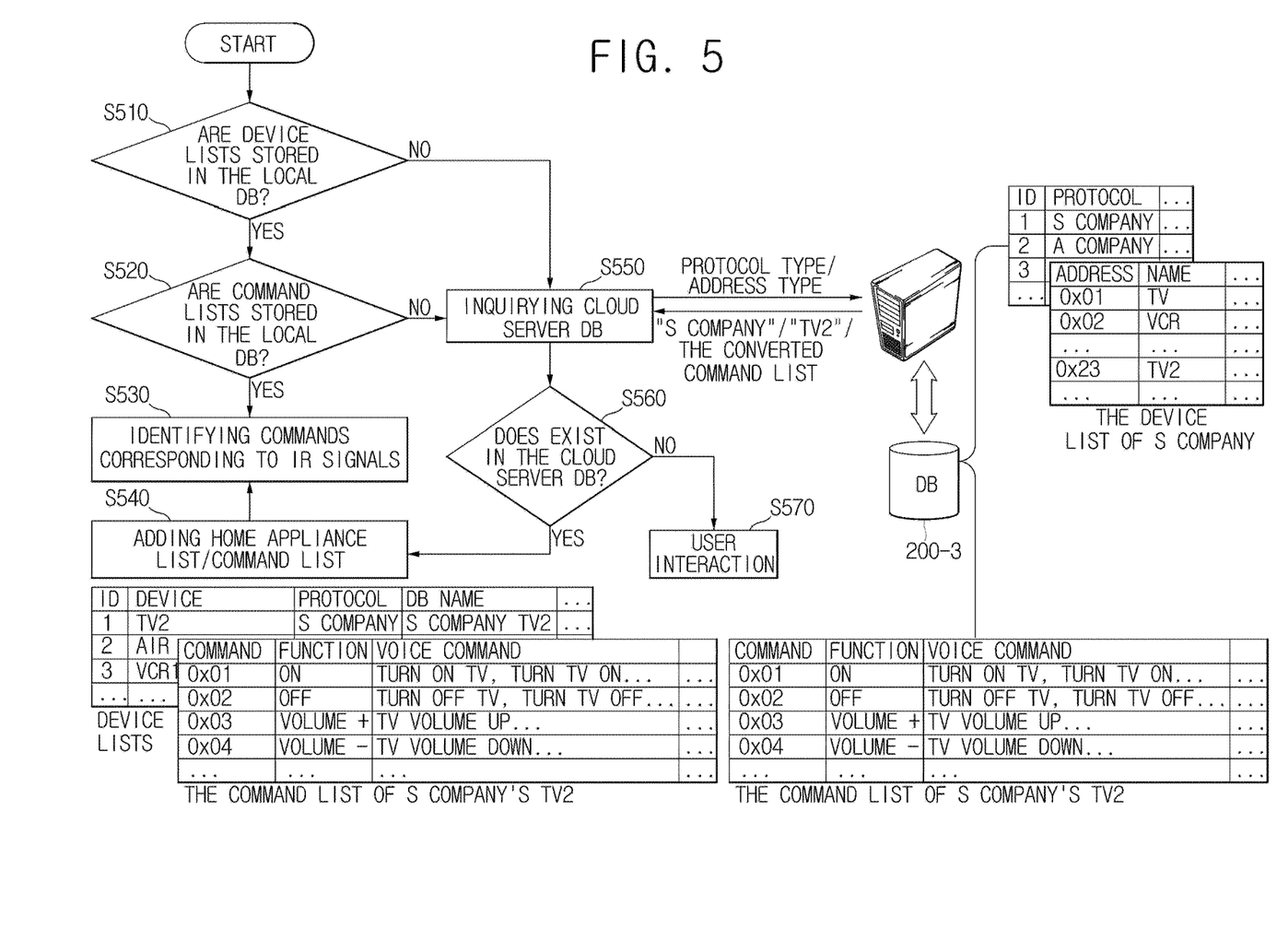
FIG. 5 is a drawing illustrating an example embodiment of learning the multiple IR signals by managing and updating lists for the slave electronic devices, i.e., device lists, and their corresponding command lists.

FIG. 5 is a drawing illustrating an example embodiment of learning the multiple IR signals by managing and updating one or more lists for the slave electronic devices and their corresponding one or more command lists.

If the particular IR signal for controlling the specific slave electronic device is acquired in the predetermined space, the particular IR signal may be analyzed. The IR receiver module (not shown) may maintain its signal as High in IDLE state. The IR receiver module may have its signal to be fallen as Low when receiving an IR signal. Accordingly, the IR receiver module may detect receiving of the particular IR signal at falling edge by using external interrupts. If an interrupt is detected, length of data of a start bit may be measured by running a timer. And a protocol is determined based on the length of the measured data of the start bit and the data may be extracted by a parsing process by each protocol type. During this process described above, information on address representing the type of a device may be extracted.

Referring to FIG. 5, it may be decided if the one or more lists for the slave electronic devices, hereinafter referred as "device lists", exist in the local database based on the protocol type and an address type at a step of S510. For instance, it may be decided if a list for S company's TV exists in the local database. If at least one of the device lists exists in the local database at a step of S510-Y, then it may be determined if a specific command list corresponding to both the protocol type and the address type exists in the local database at a step of S520. As the example explained above, it may be determined if the command list of the S company's TV exists in the local database. If the specific command list exists in the local database at a step of S520-Y, one or more commands included in the particular IR signal may be identified by referring to the specific command list at a step of S530.

However, in case it is determined that the device lists are not stored in the local database or the specific command list corresponding to both the protocol type and the address type is not in the local database at a step of S510-N or S520-N, a database 200-3 of a cloud server may be referred to by using information on both the protocol type and the address type at a step of S550. Further, in case there is no information in the database 200-3 of the cloud server at a step of S560-N, the information on the user interactions or the operating information on the IoT devices may be obtained at a step of S570, and at least part of the device lists and the command lists corresponding to the obtained IR signal may be generated and then stored in at least one of the database 200-3 of the cloud server and the local database (not shown). Otherwise, in case the database 200-3 of the cloud server contains the device lists and the command lists at a step of S560-Y, at least part of the device lists and the command lists may be acquired from the database 200-3 of the cloud server at a step of S540. Herein, the local database (not shown) may be updated by using at least part of the device lists and the command lists.

Figure 6:
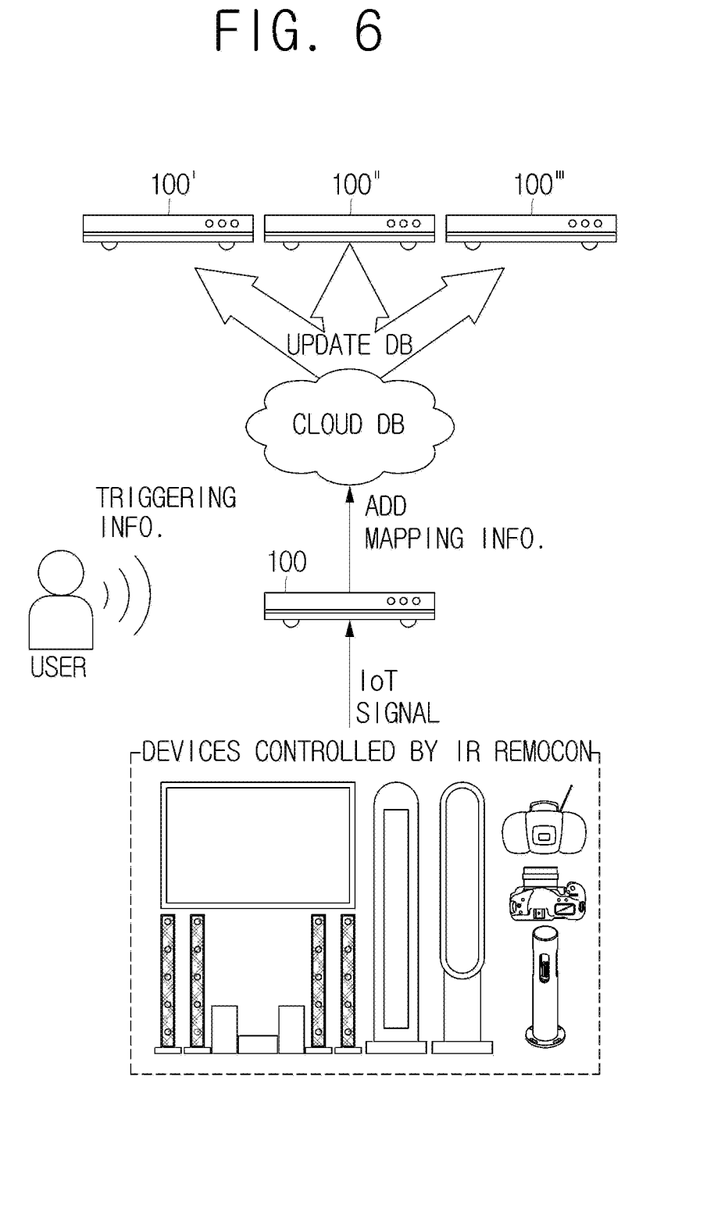
FIG. 6 is a drawing illustrating an example embodiment of providing information on updated database to other control devices in case mapping information between the current triggering information and a specific identifier of a specific IR signal is newly added into the database.

FIG. 6 is a drawing illustrating an example embodiment of providing information on the updated database to other control devices in case the mapping information between triggering information and at least one identifier of at least one IR signal is newly added into the database.

If the database 200-1 is updated in accordance with the process described above, a server (not shown) managing the database 200-1 may provide the mapping information between the at least one identifier of the respective IR signals and their corresponding triggering information stored in the updated database 200-1 to other control devices in at least part of spaces among a 1-st space to an n-th space. Specifically, referring to FIG. 6, in case there is no particular reference triggering information corresponding to the identifier of the particular IR signal in the database 200-1, the IR signal learning unit 130 as described above may store in the database 200-1 the mapping information by mapping the at least one identifier of the particular IR signal to the current triggering information corresponding thereto as a result of analyzing the information on the user interactions or the operating information on the IoT devices in the predetermined space, and the server (not shown) managing the updated database 200-1 may provide the mapping information between the at least one identifier of the particular IR signal and the current triggering information stored in the updated database 200-1 to other control devices (100', 100", 100''') in at least part of the 1-st space to the n-th space among which the database 200-1 is being shared. Therefore, the triggering information acquiring unit 110 may support the control device in said another space other than the predetermined space to obtain the current triggering information corresponding to the identifier of the particular IR signal.

Figure 7:
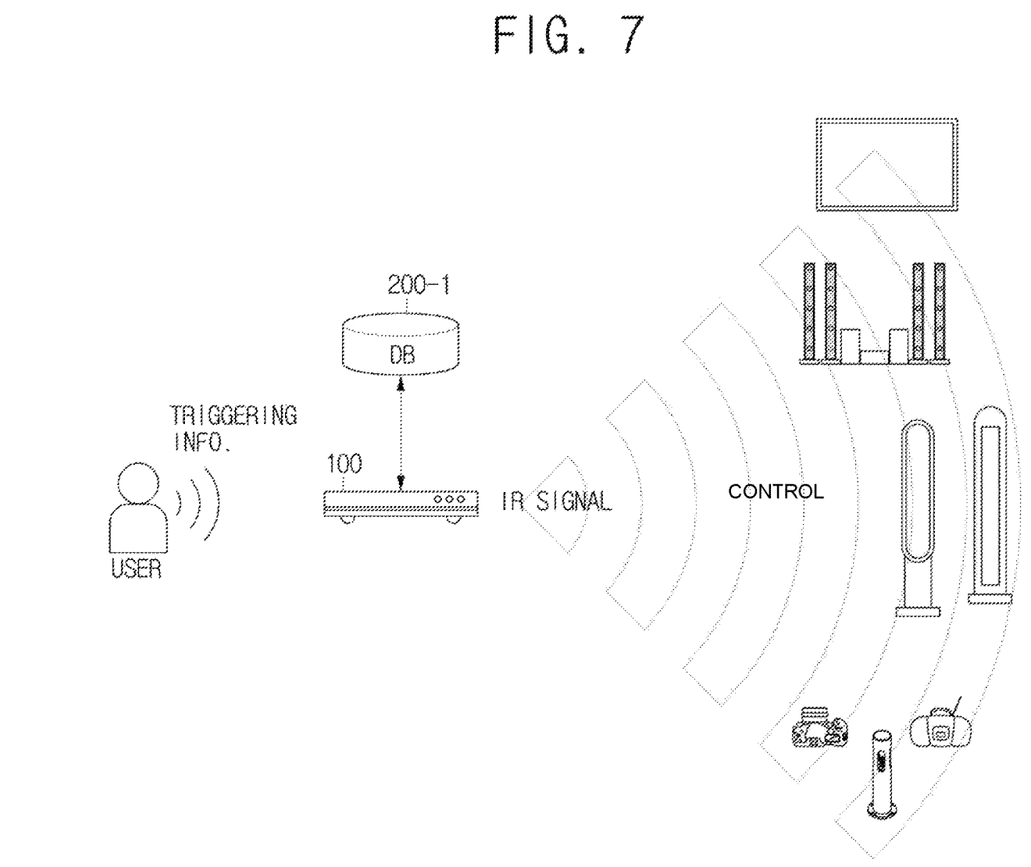
FIG. 7 is a drawing illustrating an example embodiment of generating a particular IR signal for controlling a specific slave electronic device by acquiring current triggering information in accordance with the present invention.

Hereinafter, an example embodiment will be disclosed, in which the control device may generate the particular IR signal for controlling the specific slave electronic device by obtaining the current triggering information. For example, in case that the user speaks out "Turn on TV", an operation of sending out the specific IR signal having the power of the TV be turned on may be performed.

FIG. 7 is a drawing illustrating the example embodiment of generating the particular IR signal for controlling the specific slave electronic device by obtaining the current triggering information generated by the user in accordance with the present invention.

The triggering information acquiring unit 110 described above may obtain the current triggering information for controlling the specific slave electronic device in the predetermined space. More specifically, as shown in FIG. 7, the user in the predetermined space may generate the current triggering information to control the specific slave electronic device or the same kind thereof, and then the triggering information acquiring unit 110 may acquire the current triggering information. Herein, means for acquiring the current triggering information may be varied. For example, the triggering information acquiring unit 110 may acquire the current triggering information by collecting user voices as the voice data via microphone. Further, if the voice data is collected, the collected voice data may be analyzed via a STT engine and then converted into text information, and the converted text information may be analyzed to obtain the user command data as the current triggering information. Besides, the current triggering information may be acquired by obtaining user gestures through camera or touch screen. The obtained user gestures may be transformed into the text information through image analyzing or data processing.

The IR signal generating unit 120 described above may generate or support said another control device to generate the particular IR signal by recognizing the current triggering information in case the user in the predetermined space intends to control the specific slave electronic device or the same kind thereof. Specifically, if the user in the predetermined space generates the current triggering information described above in order to control the specific slave electronic device or the same kind thereof, the IR signal generating unit 120 may generate or support other devices, e.g., a remote controller, to generate the particular IR signal by obtaining the at least one identifier of the particular IR signal corresponding to the particular reference triggering information stored in the database 200-1. Accordingly, the control device 100 may control the specific slave electronic device. For example, in case that the voice data are acquired by the user uttering "Turn on the power of the TV", command data capable of instructing the TV to be turned on may be obtained as the current triggering information as a result of analyzing the voice data. In this case, the IR signal generating unit 120 may acquire information on at least one identifier of the particular IR signal corresponding to the current triggering information capable of having the power of the TV be turned on by referring to the database 200-1 and may send out the particular IR signal on the basis of the acquired information on the at least one identifier of the particular IR signal.

Meanwhile, if there is no identifier of the particular IR signal corresponding to the current triggering information in the database 200-1, the IR signal generating unit 120 may obtain a specific identifier of a specific IR signal corresponding to specific reference triggering information having the highest degree of similarity with the current triggering information among all the identifiers of the IR signals stored in the database 200-1. For example, in case that the user said "Turn on the power of the TV" as the current triggering information but if there is no corresponding IR signal in the database 200-1, the specific identifier of the specific IR signal corresponding to the specific reference triggering information, e.g., "Turn on TV", having the highest degree of similarity with the current triggering information, i.e., "Turn on the power of the TV", may be obtained and the specific IR signal may be generated on the basis thereof.

Herein, on condition that the current triggering information and the specific reference triggering information are respectively divided into a predetermined number of pieces of data, a degree of similarity may be calculated as a ratio of (i) the number of intersections of the divided data of the current triggering information and that of the specific reference triggering information to (ii) the number of unions of the divided data of the current triggering information and that of the specific reference triggering information. Therefore, if the value of the ratio is 1, both the current triggering information and the specific reference triggering information are same each other. Otherwise, if the value of the ratio is 0, the current triggering information and the specific reference triggering information may be a completely different. However, although the specific reference triggering information has the highest degree of similarity with the current triggering information, there may be case in which the identifier of the IR signal corresponding to the specific reference triggering information is not selected if the degree of similarity is determined as being less than a preset value. That is, information similar to the current triggering information may not be retrieved from the database 200-1 for such a case. For instance, in case that specific reference triggering information, e.g., "Turn on radio", has the highest degree of similarity with the current triggering information, e.g., "Turn on TV", given by the user, the specific reference triggering information, i.e., "Turn on radio", may not be selected although it has the highest degree of similarity.

Referring to FIG. 3 again, if the specific identifier of the specific IR signal corresponding to the specific reference triggering information having the highest degree of similarity with the current triggering information is selected among the plurality of identifiers of the IR signals stored in the database 200-1, the triggering information learning unit 140 may store the mapping information in the database 200-1 by correlating one another of (i) the current triggering information, (ii) the specific identifier of the specific IR signal corresponding to the specific reference triggering information having the highest degree of similarity with the current triggering information, and (iii) the specific IR signal corresponding to the specific identifier. But, it may not be necessary to store the mapping information including the respective IR signals if it is possible to generate the respective IR signals by using their corresponding identifiers. As the example described above, the user speaks "Turn on the power of the TV" and there is no IR signal corresponding to the current triggering information "Turn on the power of the TV" in the database 200-1. If a user said "Turn on TV" as the current triggering information but if there is no identifier of an IR signal corresponding to the current triggering information in the database 200-1, the specific identifier of the specific IR signal corresponding to the specific reference triggering information, i.e., "Turn on the power of the TV", which has the highest degree of similarity with the current triggering information may be acquired and thereby the specific IR signal capable of instructing the TV to be turned on is generated on the basis of the specific reference triggering information. In this case, the triggering information learning unit 140 may expand the scope of recognition of the voice command by storing in the database mapping information between (i) the specific reference triggering information, i.e., "Turn on the power of the TV", along with the current triggering information, i.e., "Turn on TV", and (ii) the specific identifier of the specific IR signal for instructing the TV to be turned on.

Meanwhile, if there is information in the local database, the learning process for the current triggering information and its corresponding IR signals may be performed by referring to the local database. However, if there is no information in the local database, the learning process may be performed by referring to the cloud database. Herein, network efficiency may be increased through Fog Computing which reduces unnecessary network usage.

Referring to FIG. 3 again, the mapping information adjusting unit 150 may adjust the accuracy of the mapping information of the specific IR signal, the specific identifier of the specific IR signal and the specific reference triggering information stored in the database 200-1 with respect to the control device 100 in the predetermined space in case that feedback information inputted by the user in response to the generated specific IR signal is negative. For example, in case the user utters "Turn on the power of the TV" as the current triggering information, if the IR signal generating unit 120 generates another IR signal for turning on the power of an air conditioner instead of a TV, the user may input a negative feedback to represent his or her dissatisfaction. The feedback information may be acquired in a variety of ways. For example, remote controller's signal inputted by the user to correct malfunction of the air conditioner may be used as a means for his or her negative feedback. The mapping information adjusting unit 150 may decrease the accuracy of the mapping information between the specific IR signal for turning on the air conditioner and the specific reference triggering information, i.e., "Turn on the power of the TV", saved in the database 200-1 at least for the control device 100 in the predetermined space. The IR signal generating unit 120 may refer to the accuracy of the mapping information to determine whether to generate the specific IR signals by referring to its corresponding specific reference triggering information. If the feedback information inputted by the user is negative, the mapping information may be deleted from the database 200-1. However, in this case, there may be drawbacks that the database may be corrupted by malicious users.

Contrarily, if the feedback information inputted by the user in response to the generated specific IR signal is positive, the mapping information adjusting unit 150 may adjust upward the accuracy of the mapping information of the current triggering information, the specific identifier of the specific IR signal and the specific IR signal that is recorded in the database 200-1, and if the accuracy of the mapping information is more than the preset value, improved mapping information may be provided to local database or control devices in another space.

Meanwhile, the IR signal generating unit 120 may generate or support another device to generate a predetermined IR signal by referring to pattern information of at least one of the IR signals obtained on a basis of records of controlling the specific slave electronic device in the predetermined space. For a reference, the pattern information may include information on time of generation of the IR signal for controlling the specific slave electronic device. For instance, if voice command, e.g., "Turn on an air conditioner", is acquired at a certain time for several consecutive days and thereby an IR signal capable of turning on the air conditioner is generated, the IR signal generating unit 120 may generate or support said another device to generate the IR signal capable of automatically turning on the air conditioner at the same time. Besides, if some pattern including a step (1) of a user saying "Turn on TV", a step (2) of the user saying "Turn down the volume", and a step (3) of the IR signal generating unit 120 generating an IR signal according to the step (1) and the step (2) is detected as being repeated, the IR signal generating unit 120 may automatically generate or support said another device to generate the IR signal capable of turning down the volume after it generates the IR signal capable of turning on the TV. However, as the examples described above, if the feedback of the user is positive, the database 200-1 is updated accordingly and may be provided to other users and if the feedback of the user is negative, information on the pattern may be deleted.

In addition, the IR signal generating unit 120 may generate or support said another device to generate the IR signal by further taking into account speaker information recognized by analyzing the voice data included in the current triggering information. That is, user information may also be considered while considering the pattern information. For example, the IR signal generating unit 120 may generate or support said another control device to generate a certain IR signal by further considering preference contents by the user and control pattern of the slave electronic devices by the user.

The following method may be used to distinguish speakers. Initially, a variety of sounds of the house including the voice of the user may be collected. And then, spectrogram is extracted from the collected voice data to separate sounds corresponding to the human voice, and the speakers may be identified and grouped on the basis of the separated voice spectrogram. And based on the grouped spectrogram, an identifier of each speaker may be assigned. If the user utters sounds to generate the IR signal and the voice data of the user is acquired from the uttered sounds, the identifier of the speaker may be obtained by analyzing and comparing extracted user spectrogram of the user who utters a current voice command with voice spectrograms to which respective identifiers of the speakers are assigned.

Meanwhile, the IR signals may be acquired in the predetermined space by rotating one or more IR sensors by a certain angle. The control device 100 may have mechanical means capable of rotating the one or more IR sensors by the certain angle. The IR signals transmitted from multiple directions in the predetermined space may be obtained in accordance with the present invention.

Besides, the IR signal generating unit 120 may determine a location of the specific slave electronic device in the predetermined space according to the current triggering information and generate or support said another device to generate an IR signal with a certain angle by referring to the information on the location of the specific slave electronic device. For example, if the user utters "Turn on the air conditioner", the IR signal generating unit 120 may recognize it as triggering information related to the control of the air conditioner, determine a location of the air conditioner in the predetermined space and generate or support said another control device to generate IR signals towards the direction of the air conditioner accordingly. For example, the control device 100 may transmit the IR signals towards the direction of the air conditioner by rotating IR transmitter in case that the control device 100 is equipped with rotatable IR transmitter (not shown).

In addition, the control device 100 may allow a user to set a condition for generating an IR signal for controlling the specific slave electronic device. If the condition is determined as being met, the IR signal generating unit 120 may generate or may support said another control device to generate an IR signal accordingly.

Moreover, the control device 100 may provide statistical information by analyzing the records of controlling the specific slave electronic device in the predetermined space according to at least one IR signal.

Further, the current triggering information may be remotely provided to the control device 100 via mobile terminals. In this case, it may be possible to control the slave electronic devices by generating IR signals at a space where the control device 100 is not placed and providing the generated IR signal to the slave electronic devices which are placed in the same space with the control device 100.

Referring to FIG. 3 again, the communication unit 160 may perform a function of having the control device 100 be capable of communicating with said another device, the local database 200-2, the database 200-1, or a module. In addition, the communication unit 160 may receive information on operations from the IoT devices. Besides, in case that current triggering information is obtained remotely via the mobile terminal, the communication unit 160 may send out the current triggering information to the control device 100.

The control unit 170 may perform functions of controlling data flow between the triggering information acquiring unit 110, the IR signal generating unit 120, the IR signal learning unit 130, the triggering information learning unit 140, the mapping information adjusting unit 150 and the communication unit 160. That is, the control unit 170 may have the triggering information acquiring unit 110, the IR signal generating unit 120, the IR signal learning unit 130, the triggering information learning unit 140, the mapping information adjusting unit 150 and the communication unit 160 respectively perform their own functions by controlling the data flow between the individual component units of the control device 100.

The control unit 170 may include hardware configurations such as MPU (Micro Processing Unit) or CPU (Central Processing Unit), Cache Memory, Data Bus etc. and software configurations such as Operating Systems and applications performing specific purposes. If control instructions for each of the component units for operation of the control device 100 are read from memory according to system clock, electrical signal is generated based on the control instructions read to operate the individual component units of the hardware.

The present invention has an effect of not only controlling the slave electronic devices in the predetermined space by easily generating remote controller signals via voice recognition without operating individual remote controllers, but also controlling any slave electronic device including new one based on the remote controller signals by learning the remote controller signals in the predetermined space.

Also, the present invention has another effect of quickly expanding the mapping information by sharing the database among several control devices in different spaces, and newly saving the current triggering information in the database.

In addition, the present invention has still another effect of easily controlling various types of the slave electronic devices without remote controllers by converting the current triggering information generated by the user into the particular IR signal with a reference to the database and sending out the particular IR signal to control the slave electronic devices in the house.

Besides, the present invention has still yet another effect of expanding the mapping information by generating the specific IR signal corresponding to the specific reference triggering information having the highest degree of similarity with the current triggering information generated by the user in case there is no particular reference IR signal corresponding to the current triggering information in the database.

Further, the present invention has still another effect of generating a certain IR signal by referring to pattern information of at least one IR signal acquired based on logs with records of controlling the electronic devices in the predetermined space, and of generating at least one IR signal reflecting user features on the basis of recognized speaker information which is obtained by recognizing the user having uttered the voice.

In addition, the present invention has still yet another effect of acquiring or generating the IR signal by minimizing the influence of the directivity of the IR signal via generating the IR signal in a direction of which the device is located and of obtaining the IR signal in a specific direction by changing a sensing angle of the one or more IR sensors in acquiring or generating the IR signal.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled artisan in a pertinent field. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language codes made by a complier but also a high level codes that can be used by an interpreter etc., which is executed by a computing device. The aforementioned hardware device can work as more than a software module to perform the technical features of the present invention and they can do the same in the opposite case.

As seen above, the present invention has been specifically described by such matters as detailed components, limited embodiments, and drawings. While the invention has been shown and described with respect to the preferred embodiments, it, however, may be appreciated by those skilled in the art that various changes and modifications may be made without departing from the spirit and the scope of the present invention as defined in the following claims.

Accordingly, the thought of the present invention must not be confined to the explained preferred or example embodiments, and the following patent claims as well as everything including variations equal or equivalent to the patent claims pertain to the category of the thought of the present invention.

What is claimed is:

1. A method of a control device controlling or supporting another control device to control a slave electronic device by learning multiple IR signals, comprising steps of:
  (a) the control device in a predetermined space, if at least one particular IR signal is obtained for controlling a specific slave electronic device within the predetermined space, acquiring particular reference triggering information corresponding to an identifier of the particular IR signal by referring to a database or supporting said another control device in another space other than the predetermined space to acquire the particular reference triggering information corresponding to the identifier of the particular IR signal; and
  (b) the control device in the predetermined space, in case that a user of the predetermined space or a user of said another space intends to control the specific slave electronic device or one or more similar devices, generating or supporting said another control device in said another space to generate the particular IR signal by using the particular reference triggering information,
  wherein the multiple IR signals are acquired within a 1-st space to an n-th space, where the 1-st space to the n-th space include at least part of the predetermined space and said another space,
  wherein one or more device-specific IR signals are identified and selected among the multiple IR signals, and
  wherein the database manages each piece of the reference triggering information which corresponds to the respective device-specific IR signals.

2. The method of claim 1, wherein, at the step of (b), if the user of said another space generates current triggering information to control the specific slave electronic device in said another space, the control device in said another space generates or supports another device to generate the particular IR signal corresponding to the current triggering information.

3. The method of claim 1, wherein, at the step of (a), the control device in the predetermined space searches the particular reference triggering information corresponding to the identifier of the particular IR signal by referring to a local database of the predetermined space, and wherein, if there is no particular reference triggering information corresponding to the identifier of the particular IR signal in the local database of the predetermined space, the control device in the predetermined space searches the particular reference triggering information corresponding to the identifier of the particular IR signal by referring to the database.

4. The method of claim 3, wherein, at the step of (a), the database is a cloud database, and wherein the control device in the predetermined space acquires current triggering information corresponding to the identifier of the particular IR signal as a result of analyzing information on IoT device's operation or information on user interaction in the predetermined space in case there is no particular reference triggering information corresponding to the identifier of the particular IR signal in the cloud database.

5. The method of claim 1, wherein, at the step of (a), in case there is no particular reference triggering information corresponding to the identifier of the particular IR signal in the database, the control device acquires current triggering information corresponding to the identifier of the particular IR signal as a result of analyzing the information on IoT device's operation or the information on user interaction in the predetermined space, and then the control device records mapping information between the acquired current triggering information and the identifier of the particular IR signal in the database, resulting in updating the database.

6. The method of claim 5, wherein, if the database is updated, a server for managing the database provides the mapping information between the current triggering information and the identifier of the particular IR signal to said another control device in at least part of the 1-st space to the n-th space.

7. A method of a control device controlling or supporting another control device to control a slave electronic device by learning multiple IR signals, comprising steps of:
  (a) the control device in a predetermined space obtaining current triggering information for controlling a specific slave electronic device; and
  (b) the control device obtaining or support said another control device to obtain an identifier of a particular IR signal corresponding to the current triggering information by referring to a database and generating or support said another control device to generate the particular IR signal corresponding to the current triggering information,
  wherein the multiple IR signals are acquired within a 1-st space to an n-th space, where the 1-st space to the n-th space includes at least the predetermined space,
  wherein one or more device-specific IR signals are identified and selected among the multiple IR signals, and
  wherein the database manages each piece of reference triggering information which corresponds to the respective device-specific IR signals.

8. The method of claim 7, wherein, at the step of (b), if there is no identifier of the particular IR signal corresponding to the current triggering information in the database, the control device obtains a specific identifier of a specific IR signal corresponding to specific reference triggering information having the highest degree of similarity with the current triggering information among all identifiers of IR signals saved in the database, wherein the specific IR signal is included in the multiple IR signals.

9. The method of claim 8, wherein the control device further stores mapping information among (i) the current triggering information, (ii) the specific identifier of the specific IR signal corresponding to the specific reference triggering information having the highest degree of similarity with the current triggering information, and (iii) the specific IR signal corresponding to the specific identifier in the database.

10. The method of claim 8, wherein, on condition that the current triggering information and the specific reference triggering information are respectively divided into a predetermined number of pieces of data, a degree of similarity is calculated as a ratio of (i) the number of intersections of the divided data of the current triggering information and that of the specific reference triggering information to (ii)

the number of unions of the divided data of the current triggering information and that of the specific reference triggering information.

11. The method of claim 7, further comprising a step of:
(c) the control device, in case feedback information inputted by a user in response to the particular IR signal is negative, adjusting an accuracy of the mapping information among the particular IR signal, the identifier of the particular IR signal, and its corresponding reference triggering information stored in the database at least for the control device in the predetermined space.

12. The method of claim 7, wherein the control device generates or supports said another control device to generate the particular IR signal by referring to pattern information acquired based on records of controlling the specific slave electronic device in the predetermined space according to at least one of the multiple IR signals.

13. The method of claim 12, wherein the pattern information includes information on time of generation of IR signals for controlling the specific slave electronic device.

14. The method of claim 12, wherein the control device generates or supports said another control device to generate the particular IR signal by analyzing voice data included in the current triggering information and thereby further taking into account recognized speaker information.

15. The method of claim 7, wherein the current triggering information is remotely provided to the control device via a mobile terminal.

16. The method of claim 7, wherein the control device determines a location of the specific slave electronic device in the predetermined space by referring to the current triggering information, and then generates or supports said another control device to generate the particular IR signal by a certain angle determined according to the determined location.

17. A control device in a predetermined space for controlling or supporting another control device to control a slave electronic device by learning multiple IR signals, comprising:
a triggering information acquiring unit, if at least one particular IR signal is obtained for controlling a specific slave electronic device within the predetermined space, for acquiring particular reference triggering information corresponding to an identifier of the particular IR signal by referring to a database or for supporting said another control device in another space other than the predetermined space to acquire the particular reference triggering information corresponding to the identifier of the particular IR signal; and
an IR signal generating unit, in case that a user of the predetermined space or a user of said another space intends to control the specific slave electronic device or one or more similar devices, for generating or supporting said another control device in said another space to generate the particular IR signal by using the particular reference triggering information,
wherein the multiple IR signals are acquired within a 1-st space to an n-th space, where the 1-st space to the n-th space include at least part of the predetermined space and said another space,
wherein one or more device-specific IR signals are identified and selected among the multiple IR signals, and
wherein the database manages each piece of the reference triggering information which corresponds to the respective device-specific IR signals.

18. The control device of claim 17, wherein the triggering information acquiring unit searches the particular reference triggering information corresponding to the identifier of the particular IR signal by referring to a local database of the predetermined space, and wherein, if there is no particular reference triggering information corresponding to the identifier of the particular IR signal in the local database of the predetermined space, the triggering information acquiring unit searches the particular reference triggering information corresponding to the identifier of the particular IR signal by referring to the database.

19. The control device of claim 18, wherein the database is a cloud database, and wherein the triggering information acquiring unit acquires current triggering information corresponding to the identifier of the particular IR signal as a result of analyzing information on IoT device's operation or information on user interaction in the predetermined space in case there is no particular reference triggering information corresponding to the identifier of the particular IR signal in the cloud database.

20. The control device of claim 17, further comprising an IR signal learning unit and wherein, in case there is no particular reference triggering information corresponding to the identifier of the particular IR signal in the database, the triggering information acquiring unit acquires current triggering information corresponding to the identifier of the particular IR signal as a result of analyzing the information on IoT device's operation or the information on user interaction in the predetermined space, and then the IR signal learning unit records mapping information between the acquired current triggering information and the identifier of the particular IR signal in the database, resulting in updating the database.

21. The control device of claim 20, wherein, if the database is updated, a server for managing the database provides the mapping information between the current triggering information and the identifier of the particular IR signal to said another control device in at least part of the 1-st space to the n-th space.

22. A control device in a predetermined space for controlling or supporting another control device to control a slave electronic device by learning multiple IR signals, comprising:
a triggering information acquiring unit for obtaining current triggering information capable of controlling a specific slave electronic device; and
an IR signal generating unit for obtaining or support said another control device to obtain an identifier of a particular IR signal corresponding to the current triggering information by referring to a database and generating or support said another control device to generate the particular IR signal corresponding to the current triggering information,
wherein the multiple IR signals are acquired within a 1-st space to an n-th space, where the 1-st space to the n-th space includes at least the predetermined space,
wherein one or more device-specific IR signals are identified and selected among the multiple IR signals, and
wherein the database manages each piece of reference triggering information which corresponds to the respective device-specific IR signals.

23. The control device of claim 22, wherein, if there is no identifier of the particular IR signal corresponding to the current triggering information in the database, the IR signal generating unit obtains a specific identifier of a specific IR signal corresponding to specific reference triggering information having the highest degree of similarity with the current triggering information among all identifiers of IR signals saved in the database, wherein the specific IR signal is included in the multiple IR signals.

24. The control device of claim 23, further comprising: a triggering information learning unit for further storing mapping information among (i) the current triggering information, (ii) the specific identifier of the specific IR signal corresponding to the specific reference triggering information having the highest degree of similarity with the current triggering information, and (iii) the specific IR signal corresponding to the specific identifier in the database.

25. The control device of claim 23, wherein, on condition that the current triggering information and the specific reference triggering information are respectively divided into a predetermined number of pieces of data, a degree of similarity is calculated as a ratio of (i) the number of intersections of the divided data of the current triggering information and that of the specific reference triggering information to (ii) the number of unions of the divided data of the current triggering information and that of the specific reference triggering information.

26. The control device of claim 22, further comprising:
a mapping information adjusting unit, in case feedback information inputted by a user in response to the particular IR signal is negative, for adjusting an accuracy of the mapping information among the particular IR signal, the identifier of the particular IR signal, and its corresponding reference triggering information stored in the database at least for the control device in the predetermined space.

27. The control device of claim 22, wherein the IR signal generating unit generates or supports said another control device to generate the particular IR signal by referring to pattern information acquired based on records of controlling the specific slave electronic device in the predetermined space according to at least one of the multiple IR signals.

28. The control device of claim 27, wherein the pattern information includes information on time of generation of IR signals for controlling the specific slave electronic device.

29. The control device of claim 27, wherein the IR signal generating unit generates or supports said another control device to generate the particular IR signal by analyzing voice data included in the current triggering information and thereby further taking into account recognized speaker information.

30. The control device of claim 22, wherein the IR signal generating unit determines a location of the specific slave electronic device in the predetermined space by referring to the current triggering information, and then generates or supports said another control device to generate the particular IR signal by a certain angle determined according to the determined location.

* * * * *